US007117972B2

(12) United States Patent

Mattson et al.

(10) Patent No.: US 7,117,972 B2

(45) Date of Patent: Oct. 10, 2006

(54) VIBRATION ISOLATION MOUNT FOR GARAGE DOOR OPENER

(75) Inventors: Mark C. Mattson, Oceanside, CA (US); James Patrick Stewart, San Diego, CA (US)

(73) Assignee: Linear Corporation, Carlsbad, CA (US)

( * ) Notice: Subject to any disclaimer, the term of this patent is extended or adjusted under 35 U.S.C. 154(b) by 387 days.

(21) Appl. No.: 10/619,916

(22) Filed: Jul. 15, 2003

(65) Prior Publication Data

US 2005/0011126 A1 Jan. 20, 2005

(51) Int. Cl.

*F16F 15/04* (2006.01)
*F16F 7/00* (2006.01)
*F16M 13/02* (2006.01)

(52) U.S. Cl. ...................... 181/209; 181/207; 248/612; 248/638; 248/581; 248/589

(58) Field of Classification Search ................ 181/209, 181/207; 248/610, 612, 562, 638, 581, 659, 248/678, 589

See application file for complete search history.

(56) References Cited

U.S. PATENT DOCUMENTS

| | | | | |
|---|---|---|---|---|
| 780,332 | A * | 1/1905 | Forshee | 181/207 |
| 1,919,484 | A * | 7/1933 | Saurer | 267/141 |
| 2,059,848 | A | 11/1936 | Cavitt | 248/583 |
| 2,288,172 | A | 6/1942 | Ulrich | 248/610 |
| 2,448,281 | A | 8/1948 | Saurer | 248/611 |
| 2,560,098 | A * | 7/1951 | Fernstrum | 248/659 |
| 2,914,313 | A | 11/1959 | Morris | 267/151 |
| 2,969,656 | A * | 1/1961 | Reuter | 464/87 |
| 3,154,704 | A | 10/1964 | Shaffer | 248/610 |
| 4,000,406 | A * | 12/1976 | Bhavsar | 362/296 |
| 4,296,907 | A | 10/1981 | Ishida et al. | 248/573 |
| 4,314,687 | A | 2/1982 | Logsdon | 248/610 |
| 5,040,764 | A * | 8/1991 | Dubois | 248/635 |
| 5,167,396 | A * | 12/1992 | Burba et al. | 248/610 |
| 5,221,869 | A | 6/1993 | Williams et al. | 310/83 |
| 5,407,310 | A * | 4/1995 | Kassouni | 411/107 |
| 5,628,488 | A | 5/1997 | Mann | 248/610 |
| 5,761,850 | A | 6/1998 | Lhotak et al. | 49/360 |
| 5,769,519 | A * | 6/1998 | Nicolai | 312/351.1 |
| 5,975,480 | A * | 11/1999 | Schaefer et al. | 248/678 |
| 6,082,698 | A * | 7/2000 | Dubois | 248/568 |
| 6,267,347 | B1 | 7/2001 | Ryan et al. | 248/562 |
| 6,672,560 | B1 * | 1/2004 | Hart | 248/638 |
| 6,847,136 | B1 * | 1/2005 | Mattson | 310/51 |
| 6,886,799 | B1 * | 5/2005 | Yamanashi | 248/610 |
| 2002/0144852 | A1 * | 10/2002 | Shimizu et al. | 180/300 |

OTHER PUBLICATIONS

Raynor Garage Doors Flitestar Garage Door Opener; "Residential Opener Installation Instructions" Dec. 1997 Dixon, Illinois 61021; pp. 1-25.

* cited by examiner

*Primary Examiner*—Edgardo San Martin
(74) *Attorney, Agent, or Firm*—Hogan & Hartson LLP

(57) ABSTRACT

The invention provides a vibration isolation mount for a motorized garage door opener system. The mount includes a substantially planar first mounting plate with apertures configured for mounting to structure inside a garage, and a substantially planar second mounting plate with threaded bolt shafts or other mounting elements configured for mounting to motor mounting structure mounted to a drive motor for use in the system. A vibration isolation material, which may be a natural or synthetic rubber, is disposed between the first and second mounting plates to isolate noise and vibration produced by the motor from the structure mounting the assembly to the interior of the garage.

50 Claims, 5 Drawing Sheets

VIBRATION ISOLATION MOUNT FOR GARAGE DOOR OPENER

BACKGROUND OF THE INVENTION

The invention relates generally to motorized garage door opener systems. More specifically, the invention provides a mount for the drive motor in a motorized garage door opener system that isolates the drive motor from the structure it is mounted to and decreases the transmission of noise and vibration from the drive motor to the structure.

Motorized garage door opener systems are well known and in wide use. Such systems typically include an electric drive motor that drives a belt, chain, or screw linked to a garage door in such a way that driving the motor in one direction opens the door. Driving the motor in the other direction closes the door.

Such systems are popular and convenient because they spare the user the physical effort of opening and closing the door, and when used with a remote control system, the user can open and close the door without leaving his or her vehicle. Some such systems are less than ideal, though, because the electrical motor necessarily produces a certain degree of noise and vibration, and these can be transmitted to the structure to which the motor is mounted.

In most prior art systems, the drive motors are mounted on rigid metal mounting structures, which are in turn fixed securely to supporting structure, typically on the ceiling inside the garage. Vibration is transferred readily from the motor through these rigid mounting structures to the structure of the garage. This vibration can then be transmitted throughout the house or other building to which the garage is attached, which may disturb the building's occupants every time the door is opened or closed. Efforts have been made to reduce the noise and vibration produced by systems of this type—quieter motors have been used and flexible rubber or plastic belts have been substituted for rigid metal chains, for example—but in many cases more could be done.

It would be desirable, therefore, to devise a mounting apparatus that would minimize the transmission of noise and vibration from the motor assembly to the ceiling and interior of the structure in which the opener is mounted. Such a mounting apparatus should be simple and inexpensive to manufacture, install, and maintain, so as not to increase the cost of the overall system or interfere unduly with the garage door opener's ease of installation and use. The present invention provides such a mounting apparatus—one that offers these and other advantages that will be appreciated more fully with reference to the following written description and the drawings that accompany it.

SUMMARY OF THE INVENTION

The invention provides a vibration isolation mount for a motorized garage door opener system. The mount includes a substantially planar first mounting plate with apertures configured for mounting to structure inside a garage, and a substantially planar second mounting plate with threaded bolt shafts or other mounting elements configured for mounting to motor mounting structure mounted to a drive motor for use in the system. A vibration isolation material, which may be a natural or synthetic rubber, is disposed between the first and second mounting plates to isolate noise and vibration produced by the motor from the structure mounting the assembly to the interior of the garage.

DESCRIPTION OF THE PREFERRED EMBODIMENTS

Figure 1:
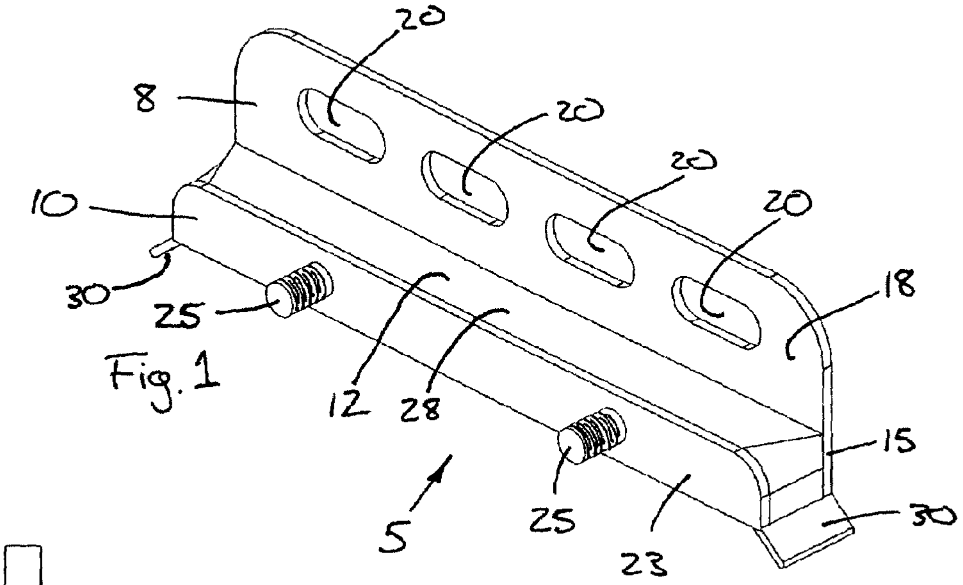
FIG. 1 is an isometric view of a vibration isolation mounting element for the drive motor of a motorized garage door opener system.

FIG. 1 is an isometric view of a vibration isolation mounting element 5 that embodies the invention. The mounting element includes a first mounting member 8 and a second mounting member 10 with a vibration isolation material 12 sandwiched between them.

The first mounting member 8 is a generally planar flat plate that includes an interface region 15 and a flange region 18. The first mounting member contacts the vibration isolation material 12 in the interface region. The flange region extends away and projects upward from the vibration isolation material, with several apertures 20 defined in the flange region of the first mounting member. The first mounting member is formed of steel, another metal, or another material that is sufficiently strong and rigid and appropriate for attachment to support structure mounted in the interior of the garage.

The second mounting member 10 also includes a generally planar flat plate 23, with one or more fastening elements 25 attached to it. In this embodiment, the fastening elements are a pair of threaded bolt shafts formed integrally with the generally planar flat plate element of the member. The second mounting member can be formed of steel, another metal, or another material that is strong and rigid enough to be mounted securely to a structure that is mounted to the drive motor.

The vibration isolation material 12 is a natural or synthetic rubber material sandwiched between the interface region 15 of the first mounting member 8 and the flat plate 23 of the second mounting member 10. The vibration material is flexible (relative to the rigid materials of the first and second mounting material)—strong enough to support the drive motor from the support structure in the garage, but flexible and soft enough to isolate the motor from the garage's support structure and thereby to reduce noise and vibration transmitted from the motor to the building. The vibration isolation material is adhered to each of the first and second mounting members.

The vibration isolation material includes a support portion 28 directly between the first and second mounting members and a pair of tabs 30—one tab at each end of the support portion. These tabs serve as dust guards when the mounting element is included in a complete garage door opener assembly.

Figure 2:
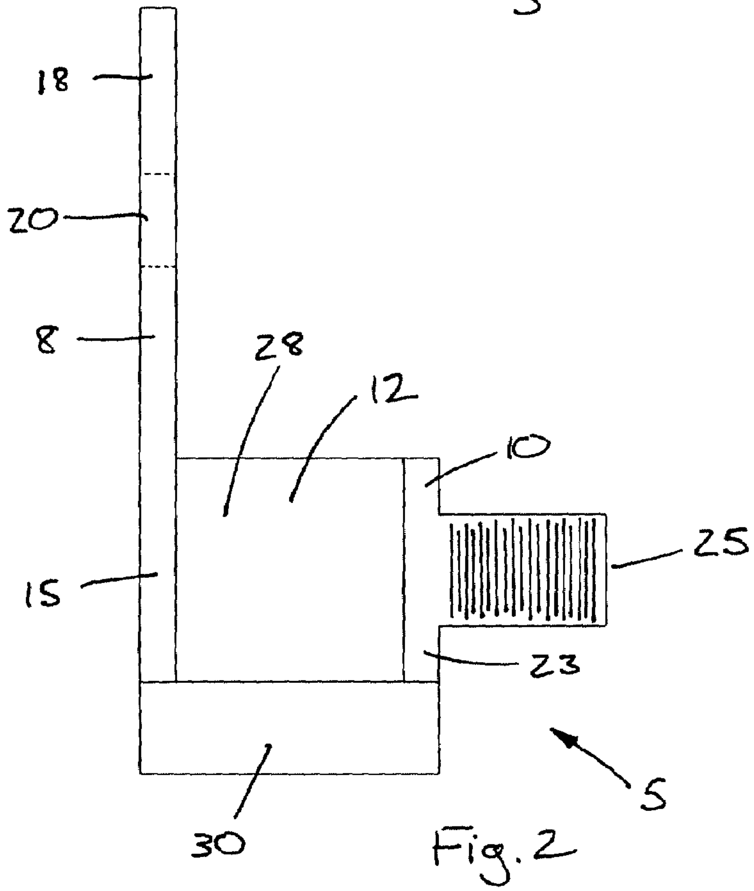
FIG. 2 is an end view of the vibration isolation mounting element shown in FIG. 1.

FIG. 2 is an end view of the vibration mounting element 5. The first mounting member 8, the second mounting member 10 and the vibration isolation material 12 can be seen in the figure, as can one of the apertures 20, one of the tabs 30, and one of the second mounting member's threaded bolt shaft fastening elements 25.

Figure 3:
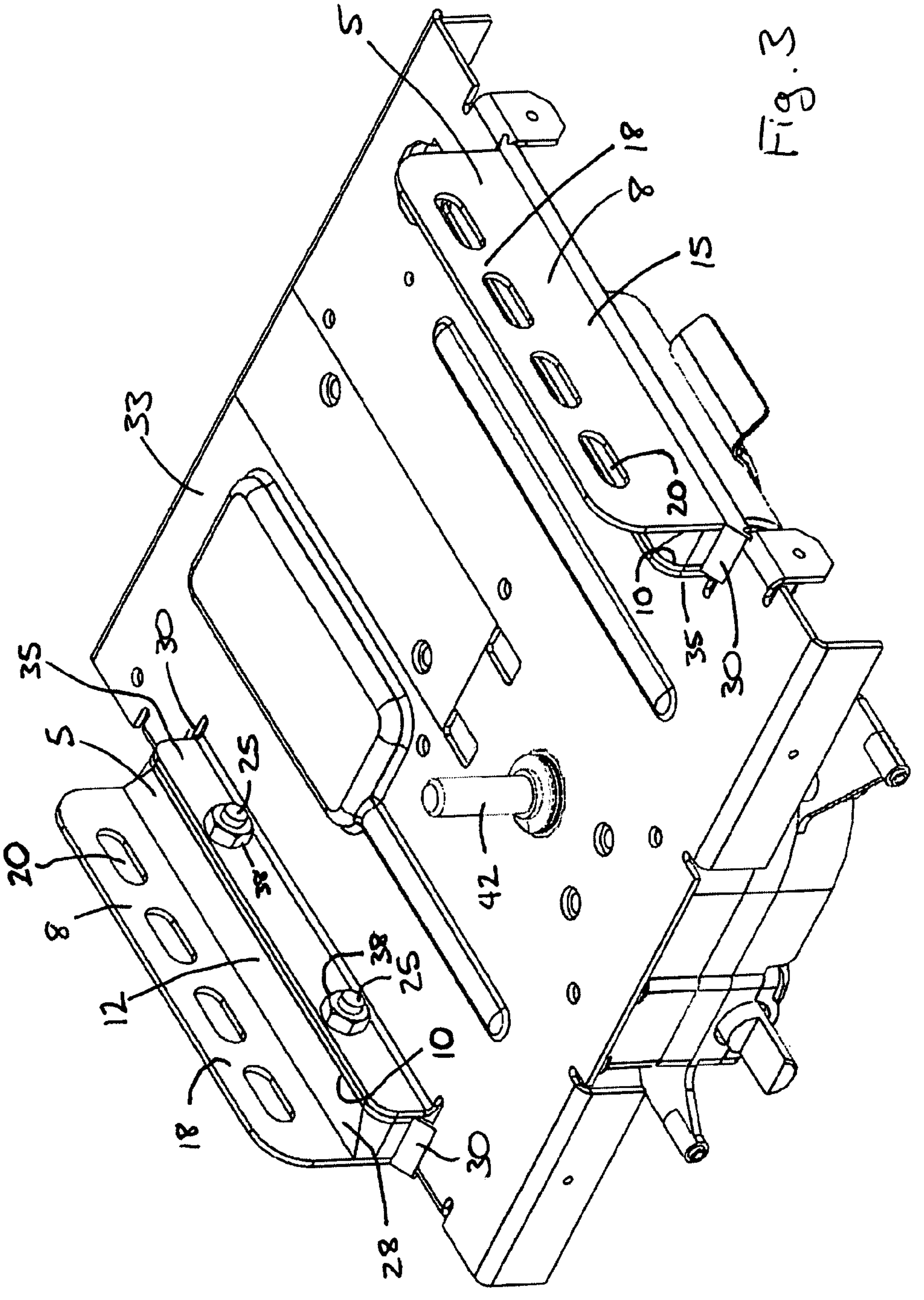
FIG. 3 is an isometric view of the vibration isolation mounting element of FIGS. 1 and 2, attached to a drive motor through a drive motor mounting plate.

FIG. 3 shows a pair of vibration mounting elements 5 mounted to a motor mounting structure 33 in the form of a drive motor mounting plate. The threaded bolt shafts 25 are fitted to holes through a pair of mounting plate flanges 35 on the drive motor mounting plate. Four nuts 38 fix the vibration mounting elements to the motor mounting structure.

Figure 4:
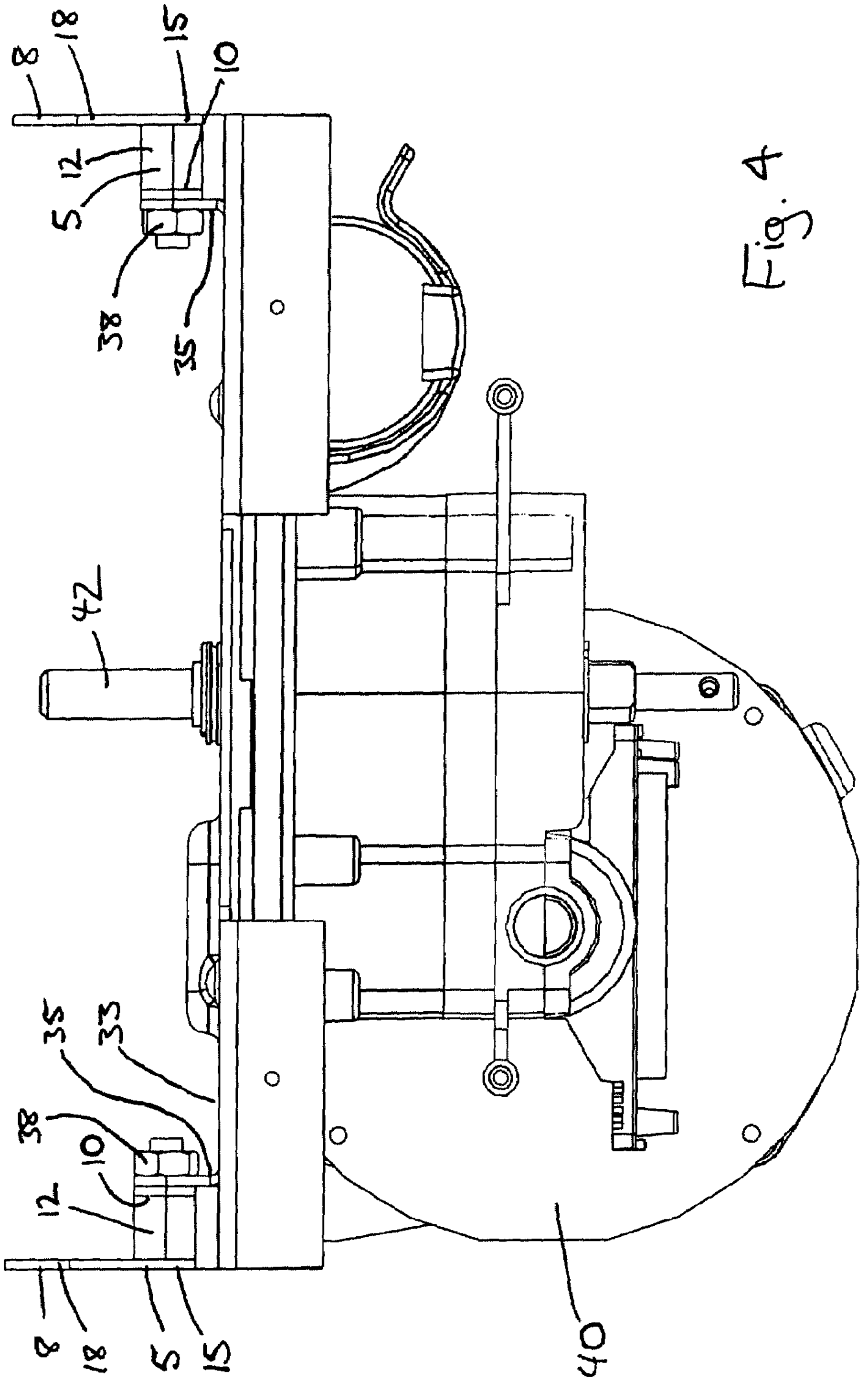
FIG. 4 is an end view of the vibration isolation mounting element, the drive motor mounting plate, and the drive motor shown in FIG. 3.

FIG. 4 is an end view of the assembly shown in FIG. 3. A drive motor 40 is mounted to the underside of the motor mounting plate 33. The drive motor is geared or otherwise linked to a drive spindle 42, which extends through the motor mounting plate 33. The drive spindle is linked to a drive belt, chain, or screw, which is connected in turn to a linkage that raises or lowers the garage door, depending on which direction the motor is driven.

Referring again to FIG. 3, the flange region 18 of the first mounting plate 8 of the vibration isolation mounting element 5 extends above the drive motor mounting plate 33, with the apertures 20 configured for mounting (with bolts or suitable fasteners) to brackets (not shown) or other structure mounted to the ceiling of the garage in which the motor is installed. The drive motor 40 hangs from the mounting plate 33, supported by the mounting element 5 from the bracket fixed to the garage. When the assembly is mounted on structure inside the garage, the apertures 20 of the vibration isolation mounting elements are aligned in a first common horizontal plane, and the threaded bolt shafts 25 are aligned in a second common horizontal plane. The motor's vibrations, which would otherwise have been transmitted very effectively by the rigid elements of the mounting assembly, are isolated and attenuated by the relatively soft and flexible vibration isolation material.

A vibration isolation mounting element of the type described above can come in a variety of sizes and configurations appropriate to specific applications and useable with conventional motors and mounting assemblies. The isolation effectiveness of the mounting element can be "tuned" somewhat, moreover, by sizing and selecting the structural portion of the vibration isolation material to optimize the isolation of the motor from the support brackets or other structure mounted to the garage.

Generally, softer vibration isolation materials will provide more effective isolation. The material must be strong enough, though, to support the weight of the drive motor and the other structure mounted to it. The isolation material should be sized and selected, moreover, so that the natural frequency of the structure does not correspond to the operating speed of the motor (to avoid undesired resonance, which could amplify the motor's vibration).

Referring now to FIG. 1, the structural portion 28 of the vibration isolation mounting element 5 in one embodiment is about 5.5 inches (14 cm) long, about 0.5 inches (1.3 cm) high, and about 0.5 inches (1.3 cm) thick. The material of the structural portion is silicone rubber with a hardness of about 50 Shore A. This embodiment has been found effective for use with a system in which the combined weight of the drive motor 40 and the drive motor mounting plate 33 (see FIG. 3) is about 15–20 pounds (7–9 kg), and the motor's usual operating speed is about 1800 revolutions per minute. These exact dimensions and specifications are not critical, though, and may vary considerably in a wide range of embodiments that all afford effective isolation between the motor and the assembly's supporting structure.

Figure 5:
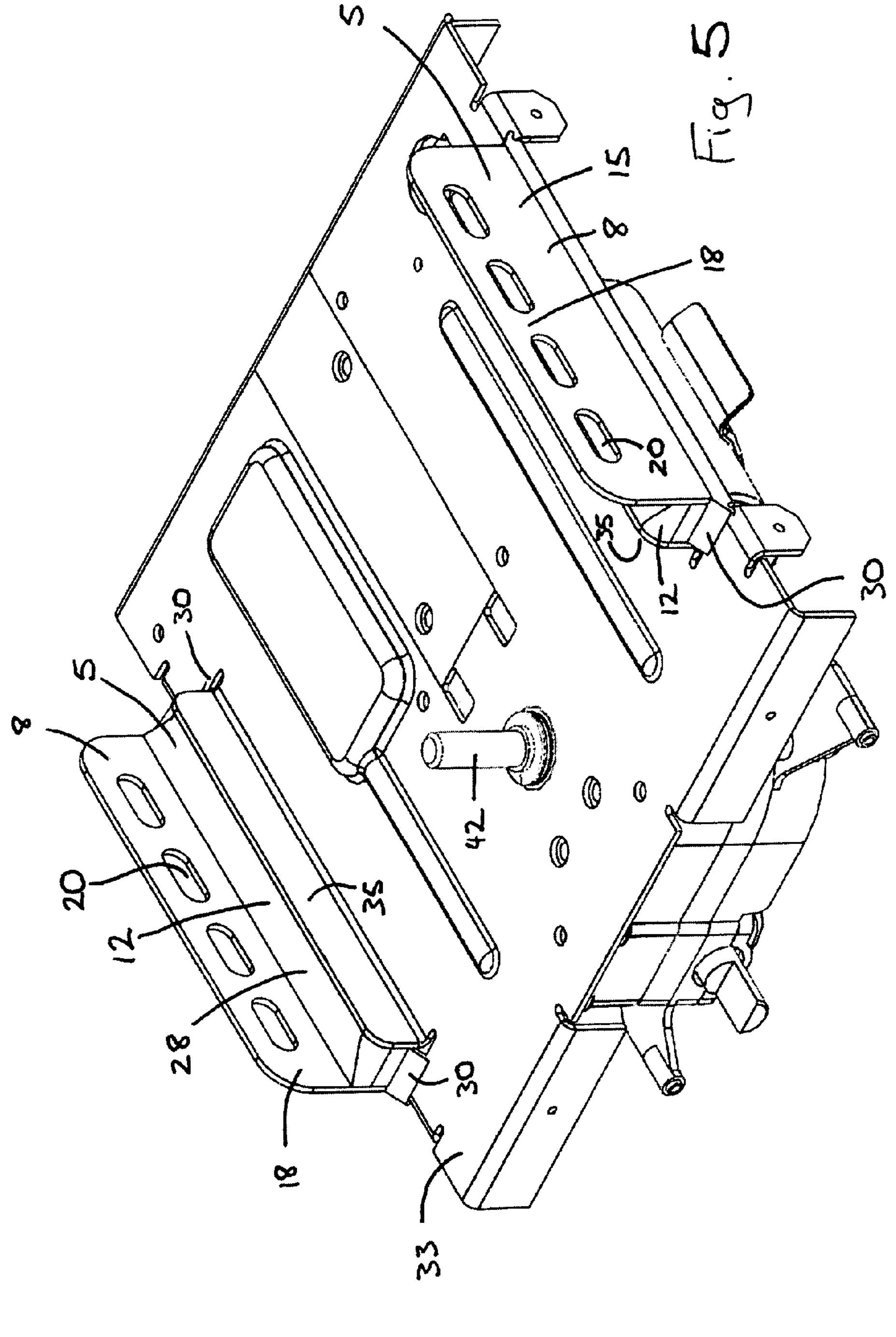
FIG. 5 is an isometric view of an alternative vibration isolation mounting element mounted directly to a drive motor mounting plate.
Figure 6:
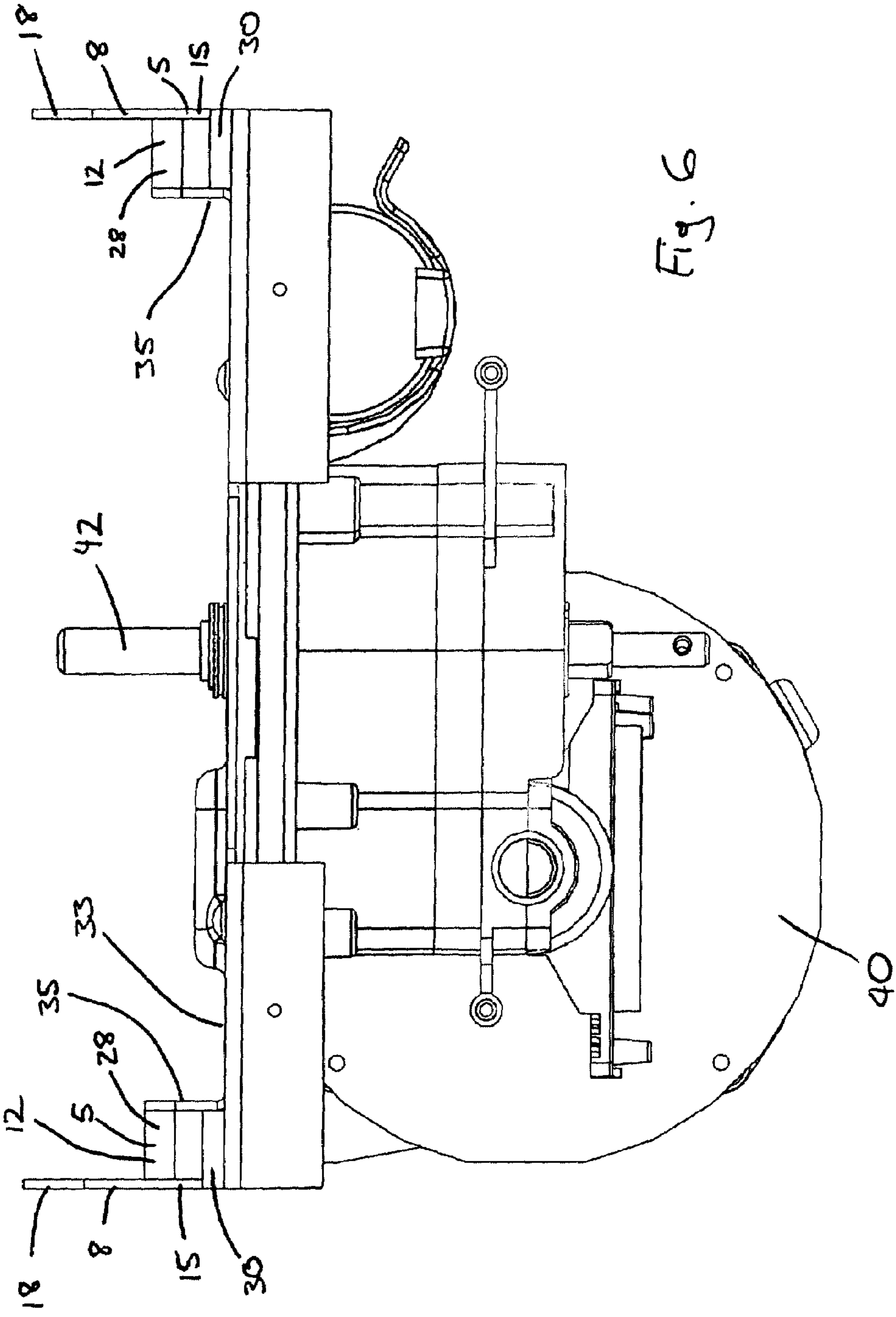
FIG. 6 is an end view of the vibration isolation mounting element, the drive motor mounting plate, and the drive motor of FIG. 5.

FIGS. 5 and 6 illustrate an alternative embodiment of the invention. This embodiment is generally similar to the embodiment described above. In this embodiment, though, the vibration isolation material 12 of the vibration isolation mounting element 5 is adhered directly to the mounting plate flanges 35 of the drive motor mounting plate 33. This construction dispenses with the second mounting plate 10, the bolt shafts 25, and the nuts 38 of the embodiment shown in FIGS. 1–4.

The materials, dimensions, and configurations of the exemplary embodiments described in this document can be modified considerably without departing from the broad principles of the invention, and the scope of the invention is not limited to the embodiment described above. The scope of the invention should be determined instead by reference to the claims appended hereto, along with the full scope of equivalents to which those claims are legally entitled.

What is claimed is:

1. A vibration isolation mounting element for a motorized garage door opener system, the vibration isolation mounting element comprising:
- a first mounting member configured for mounting to structure mounted inside a garage;
- a second mounting member configured for mounting to structure mounted to a motor in the motorized garage door opener system; and
- a vibration isolation material disposed between the first mounting member and the second member to hold the first and second mounting members together while isolating the structure mounted inside the garage from vibration produced by the motor, wherein
- the first mounting member is a substantially planar flat plate having
  - an interface region in contact with the vibration isolation material; and
  - a flange region extending away from the vibration isolation material and defining at least one aperture configured to receive a fastener for mounting the vibration isolation mounting element to structure inside a garage.

2. The vibration isolation mounting element of claim 1, wherein the flange region includes structure defining at least two apertures, each said aperture configured to receive a fastener for mounting the vibration isolation mounting element to structure inside the garage.

3. The vibration isolation mounting element of claim 2, wherein at least two of the apertures are aligned in a common horizontal plane when the vibration isolation mounting element is mounted to the structure inside the garage.

4. The vibration isolation mounting element according to claim 1, wherein the second mounting member includes a substantially planar flat plate.

5. The vibration isolation mounting element according to claim 4, wherein the second mounting member includes at least one fastening element attached to the substantially planar flat plate, wherein the fastening element is configured for mounting to a structure mounted to a drive motor in the motorized garage door opener system.

6. The vibration isolation mounting element according to claim 5, wherein the second mounting member includes at least two fastening elements attached to the substantially planar flat plate, wherein each of the fastening elements is configured for mounting to a structure mounted to the drive motor.

7. The vibration isolation mounting element according to claim 6, wherein at least two of the fastening elements attached to the substantially planar flat plate are aligned in a common horizontal plane when the vibration isolation mounting element is mounted to structure inside a garage.

8. The vibration isolation mounting element according to claim 5, wherein the fastening element is a threaded bolt shaft configured to receive a nut to fix the vibration isolation mounting element to the structure mounted to the drive motor.

9. The vibration isolation mounting element of claim 8, wherein the second mounting member includes at least two threaded bolt shafts attached to the substantially planar flat plate, and wherein each of said threaded bolt shafts is configured to receive a nut to fix the vibration isolation mounting element to the structure mounted to the drive motor.

10. The vibration isolation mounting element of claim 9, wherein at least two of the threaded bolt shafts are aligned in a common horizontal plane when the vibration isolation mounting element is mounted to structure inside a garage.

11. The vibration isolation mounting element of claim 1, wherein the first and second mounting members are formed of metal, and wherein the vibration isolation material is formed of a material selected from the group consisting of natural rubber and synthetic rubber.

12. A vibration isolation mounting element for a motorized garage door opener system, the vibration isolation mounting element comprising:

a substantially planar first mounting plate, the first mounting plate comprising an interface region and a flange region;

a substantially planar second mounting plate;

at least one fastening element attached to the second mounting plate and configured for mounting to a structure mounted to a drive motor in the motorized garage door opener system; and a vibration isolation material disposed between the first and second mounting plates;

wherein the vibration isolation material contacts the first mounting plate in the interface region and the first mounting plate's flange region extends outward of the vibration isolation material and the first mounting plate's interface region; and wherein the structure of the first mounting plate's flange region defines at least one aperture configured to receive a fastener for mounting the vibration isolation mounting element to structure inside a garage.

13. The vibration isolation mounting element according to claim 12, wherein at least two fastening elements are attached to the second mounting plate at least two of the fastening elements are configured for mounting to the structure mounted to the drive motor.

14. The vibration isolation mounting element according to claim 13, wherein at least two of the fastening elements attached to the second mounting plate and configured for mounting to the structure mounted to the drive motor are aligned in a common horizontal plane when the vibration isolation mounting element is mounted to the structure inside the garage.

15. The vibration isolation mounting element according to claim 12, wherein the fastening element is a threaded bolt shaft configured to receive a nut to fix the vibration isolation mounting element to the structure mounted to the drive motor.

16. The vibration isolation mounting element according to claim 15, wherein the at least one fastening element includes at least two threaded bolt shafts, and wherein at least two of the threaded bolt shafts are each attached to the second mounting plate and configured for mounting to the structure mounted to the drive motor.

17. The vibration isolation mounting element of claim 16, wherein at least two of the threaded bolt shafts are aligned in a common horizontal plane when the vibration isolation mounting element is mounted to structure inside the garage.

18. The vibration isolation mounting element of claim 12, wherein the first and second mounting members are formed of metal, and wherein the vibration isolation material is formed of a material selected from the group consisting of natural rubber and synthetic rubber.

19. A motorized garage door opener system comprising:

a motor;

a motor mounting structure mounted to the motor;

a vibration isolation mounting element mounted to the motor mounting structure, the vibration isolation mounting element comprising:

a first mounting member configured for mounting to structure inside a garage;

a second mounting member configured for mounting to the motor mounting structure; and a vibration isolation material disposed between the first mounting member and the second mounting member to hold the first and second mounting members together while isolating the structure inside the garage from vibration produced by the motor, and wherein the first mounting member is a substantially planar flat plate having an interface region in contact with the vibration isolation material and a flange region extending away from the vibration isolation material and having at least one aperture configured to receive a fastener for mounting the vibration isolation mounting element to the structure inside the garage.

20. The motorized garage door opener system of claim 19, wherein the flange region includes structure defining at least two apertures, and wherein at least two of the apertures are each configured to receive a fastener for mounting the vibration isolation mounting element to the structure inside the garage.

21. The motorized garage door opener system of claim 20, wherein at least two of the apertures configured to receive a fastener for mounting the vibration isolation mounting element to the structure inside the garage are aligned in a common horizontal plane when the vibration isolation mounting element is mounted to the structure inside the garage.

22. The motorized garage door opener system of claim 19, wherein the second mounting member includes a substantially planar flat plate.

23. The motorized garage door opener system of claim 22, wherein the second mounting member includes at least one fastening element attached to the substantially planar flat plate, wherein the fastening element is configured for mounting to the motor mounting structure.

24. The motorized garage door opener system of claim 23, wherein the second mounting member includes at least two fastening elements attached to the substantially planar flat plate, and wherein at least two of the fastening elements are configured for mounting to the motor mounting structure.

25. The motorized garage door opener system of claim 24, wherein at least two of the fastening elements attached to the substantially planar flat plate and configured for mounting to the motor mounting structure are aligned in a common horizontal plane when the first mounting member of the vibration isolation mounting element is mounted to the structure inside the garage.

26. The motorized garage door opener system of claim 24, wherein the fastening element is a threaded bolt shaft configured to receive a nut to fix the vibration isolation mounting element to the motor mounting structure.

27. The motorized garage door opener system of claim 26, wherein the second mounting member includes at least two threaded bolt shafts, each of said bolt shafts configured to receive a nut to fix the vibration isolation mounting element to the motor mounting structure.

28. The motorized garage door opener system of claim 27, wherein at least two of the threaded bolt shafts configured to receive a nut to fix the vibration isolation mounting element to the motor mounting structure are aligned in a common horizontal plane when the vibration isolation mounting element is mounted to the structure inside the garage.

29. The motorized garage door opener system of claim 19, wherein the first and second mounting members are formed of metal, and wherein the vibration isolation material is formed of a material selected from the group consisting of natural rubber and synthetic rubber.

30. The motorized garage door opener system of claim 19, wherein the motor mounting structure includes a substantially planar motor mounting plate.

31. The motorized garage door opener system of claim 30, wherein the motor is configured for mounting to an underside of the motor mounting plate.

32. The motorized garage door opener system of claim 19, wherein the motor mounting structure includes at least one mounting flange, and wherein the second mounting member of the vibration isolation mounting element is configured for mounting to the mounting flange.

33. The motorized garage door opener system of claim 32, wherein the motor mounting structure includes at least two mounting flanges, and wherein the second mounting member of each of two vibration mounting elements is configured for mounting to one of the mounting flanges.

34. The motorized garage door opener system of claim 33, wherein the two mounting flanges are disposed on opposite sides of a motor mounting plate, and wherein the motor is configured for mounting to an underside of the motor mounting plate.

35. A motorized garage door opener system comprising:

a first vibration isolation mounting element and a second vibration isolation mounting element, each said vibration isolation mounting element comprising:

a substantially planar first mounting plate comprising an interface region and a flange region, wherein the flange region includes structure defining at least two apertures;

a substantially planar second mounting plate;

at least two threaded bolt shafts attached to the second mounting plate; and a vibration isolation material disposed between the interface region of the first mounting plate and second mounting plate, wherein the flange region extends outward of the vibration isolation material and the interface region;

a substantially planar motor mounting plate;

a drive motor mounted to the underside of the motor mounting plate;

a first mounting flange and a second mounting flange attached to the motor mounting plate on opposite sides of the drive motor; and nuts threaded onto the threaded bolt shafts to secure the first vibration isolation mounting element to the first mounting flange and the second vibration isolation mounting element to the second mounting flange;

wherein the apertures of the first mounting plates are configured to mount the first and second vibration isolation mounting elements, the motor mounting plate, and the drive motor to structure inside a garage.

36. A motorized garage door opener system comprising:

a motor;

a motor mounting structure mounted to the motor;

a vibration isolation mounting element mounted to the motor mounting structure, the vibration isolation mounting element comprising:

a mounting member configured for mounting to structure inside a garage; and a vibration isolation material mounted between the mounting member and the motor mounting structure to hold the vibration isolation mounting element's mounting member and the motor mounting member together while isolating the structure inside the garage from vibration produced by the motor, and wherein the mounting member is a substantially planar flat plate having an interface region in contact with the vibration isolation material and a flange region extending away from the vibration isolation material and having at least one aperture configured to receive a fastener for mounting the vibration isolation mounting element to the structure inside the garage.

37. The motorized garage door opener system of claim 36, wherein the flange region includes structure defining at least two apertures, and wherein at least two of the apertures are each configured to receive a fastener for mounting the vibration isolation mounting element to the structure inside the garage.

38. The motorized garage door opener system of claim 37, wherein at least two of the apertures configured to receive a fastener for mounting the vibration isolation mounting element to the structure inside the garage are aligned in a common horizontal plane when the vibration isolation mounting element is mounted to the structure inside the garage.

39. The motorized garage door opener system of claim 36, wherein the mounting member is formed of metal, and wherein the vibration isolation material is formed of a material selected from the group consisting of natural rubber and synthetic rubber.

40. The motorized garage door opener system of claim 36, wherein the motor mounting structure includes a substantially planar motor mounting plate.

41. The motorized garage door opener system of claim 40, wherein the motor is configured for mounting to an underside of the motor mounting plate.

42. The motorized garage door opener system of claim 36, wherein the motor mounting structure includes at least one mounting flange, and wherein the vibration isolation material is adhered to the mounting flange.

43. The motorized garage door opener system of claim 42, wherein the motor mounting structure includes at least two mounting flanges, and wherein the vibration isolation material of each of two vibration mounting elements is configured for mounting to one of the mounting flanges.

44. The motorized garage door opener system of claim 43, wherein the two mounting flanges are disposed on opposite sides of a motor mounting plate, and wherein the motor is configured for mounting to an underside of the motor mounting plate.

45. A motorized garage door opener system comprising:

a first vibration isolation mounting element and a second vibration isolation mounting element, each said vibration isolation mounting element comprising:

a substantially planar first mounting plate comprising an interface region and a flange region, wherein the flange region includes structure defining at least two apertures; and a vibration isolation material adhered to the interface region of the first mounting plate, wherein the flange region extends outward of the vibration isolation material and the interface region;

a substantially planar motor mounting plate;

a drive motor mounted to the underside of the motor mounting plate; and a first mounting flange and a second mounting flange attached to the motor mounting plate on opposite sides of the drive motor;

wherein the vibration isolation material of each of the vibration isolation mounting elements is adhered to one of the first and second mounting flanges so that the first and second vibration isolation mounting elements are disposed on opposite sides of the drive motor; and wherein the apertures of the first mounting plates are configured to mount the first and second vibration isolation mounting elements, the motor mounting plate, and the drive motor to structure inside a garage.

46. A method for assembling a motorized garage door opener system, the method comprising:

providing a motor mounted to motor mounting structure;

providing a vibration isolation mounting element comprising:

a first mounting member;

a second mounting member; and a vibration isolation material disposed between the first mounting member and the second mounting member to hold the first and second mounting members together while isolating the first mounting structure from vibration transmitted into the second mounting structure;

mounting the vibration isolation mounting element's second mounting member to the motor mounting structure; and mounting the vibration isolation mounting element's first mounting member to structure inside a garage, wherein a first horizontal plane passes through the first mounting member and does not pass through the vibration isolation material, and a second horizontal clans parallel to the first horizontal plane passes through the second mounting member and also passes through the vibration isolation material.

47. A vibration isolation mounting element as claimed in claim 1, wherein a first horizontal plane passes through the at least one aperture of the flange region and does not pass through the vibration isolation material, and a second horizontal plane parallel to the first horizontal plane passes through at least one fastening element attached to the second mounting plate and also passes through the vibration isolation material.

48. A vibration isolation mounting element as claimed in claim 47, wherein the flange region defines at least two apertures aligned in the first horizontal plane, and the second mounting member includes at least two fastening elements aligned in the second horizontal plane.

49. A vibration isolation mounting element as claimed in claim 12, wherein a first horizontal plane passes through the at least one aperture of the flange region and does not pass through the vibration isolation material, and a second horizontal plane parallel to the first horizontal plane passes through the at least one fastening element attached to the second mounting plate and also passes through the vibration isolation material.

50. A vibration isolation mounting element as claimed in claim 49, wherein the flange region defines at least two apertures aligned in the first horizontal plane, and the second mounting member includes at least two fastening elements aligned in the second horizontal plane.

* * * * *